United States Patent
West

(10) Patent No.: US 9,306,414 B2
(45) Date of Patent: Apr. 5, 2016

(54) MEDIUM VOLTAGE POWER TRANSMISSION LINE ALTERNATIVE

(71) Applicant: Richard Travis West, Ragged Point, CA (US)

(72) Inventor: Richard Travis West, Ragged Point, CA (US)

(73) Assignee: RENEWABLE POWER CONVERSION, INC., San Luis Obispo, CA (US)

( * ) Notice: Subject to any disclaimer, the term of this patent is extended or adjusted under 35 U.S.C. 154(b) by 421 days.

(21) Appl. No.: 13/929,710

(22) Filed: Jun. 27, 2013

(65) Prior Publication Data

US 2015/0001928 A1    Jan. 1, 2015

(51) Int. Cl.
*H02J 3/00*    (2006.01)
*H02J 7/35*    (2006.01)
*H02J 3/38*    (2006.01)

(52) U.S. Cl.
CPC .. *H02J 7/35* (2013.01); *H02J 3/383* (2013.01); *Y02E 10/563* (2013.01); *Y02E 10/566* (2013.01); *Y10T 307/344* (2015.04)

(58) Field of Classification Search
None
See application file for complete search history.

(56) References Cited

U.S. PATENT DOCUMENTS

2009/0295167 A1*  12/2009  Clidaras ............. F03B 13/20
                                                    290/55
2012/0181973 A1*  7/2012  Lyden ............. B60L 11/182
                                                    320/101

* cited by examiner

*Primary Examiner* — Jared Fureman
*Assistant Examiner* — Aqeel Bukhari

(57) ABSTRACT

The invention is an electrical power system for powering quasi-remote loads wherein local electric utility power is stepped up in voltage and transmitted to a remote battery bank via a low cost, two-conductor, direct burial cable. The system is configured such that current in is this cable is relatively low and constant. The battery bank is used to buffer the low power feed from the electric utility source and the high power, high crest factor remote loads. An inverter, like the type used with off-grid solar power systems, converts the DC battery power to AC power to supply the remote loads.

12 Claims, 2 Drawing Sheets

MEDIUM VOLTAGE POWER TRANSMISSION LINE ALTERNATIVE

BACKGROUND OF THE INVENTION

The installation costs, maintenance costs, environmental impacts and esthetic impacts of overhead, utility-pole-based electrical power transmission lines are significant. The present invention provides an alternative and lower cost method for powering semi-remote home sites and other semi-remote loads. The invention leverages the commercial availability of equipment designed for remote, off-grid solar photovoltaic power systems such as charge controllers, storage batteries and inverters to configure a power system with high local surge capability and with very low power transmission infrastructure costs. In some ways, the invention emulates a solar power system except that the battery charging current is lower and is available 24 hours verses 8 hours per day if the sun is shining.

BRIEF SUMMARY OF THE INVENTION

The invention is an electrical power system for powering quasi-remote loads wherein local electric utility power is typically stepped up to a maximum voltage of 1000Vac, transmitted to a remote location, stepped down, rectified and used to charge a battery bank. Power transmission is via a low cost, two-conductor, direct burial cable. The system is configured such that current in is this cable is relatively low and constant. The battery bank is used as a energy buffer between the low power feed from the electric utility source and high crest factor remote loads. An inverter, like the type used with off-grid solar power systems, converts the DC battery power to AC power to supply the remote loads.

UTILITY OF THE INVENTION

The average household electrical energy consumption in the United States is approximately 940 kilowatt-hours per month. Using the invention, an average residence located 5 miles from the nearest electrical utility source could use a single 600Vac, #10AWG two-conductor, direct burial cable to transmit electrical power. In this extreme scenario, the voltage drop over the transmission cable could on the order of 50% but would not affect the power quality at the remote residential loads. The invention provides very low electrical transmission infrastructure costs. Without the invention, a typical medium voltage overhead line would require between 88 and 132 utility poles, insulator sets and cross bars. In this case, in effect, the invention allows a typical home to be powered by a five mile long extension cord.

The value of the invention increases as the load peak-to-average ratios (crest factor) increase. The invention could be used for remote home sites, cellular telephone sites, agricultural water pumping and other semi-remote loads. As an additional benefit, short term utility power outages would not affect the power availability at the remote load site.

The invention could be packaged as a product for use by private or commercial entities. Electrical utility companies could install and lease the product when the transmission distance and the remote load profile indicate that a cost savings could be had compared to prior-art solutions.

This invention could also be used to supplement an existing solar power system or to replace a reciprocating generator in an existing hybrid solar power system.

There could also be a product opportunity for village power systems wherein each home would have a small inverter/battery set sourced from a low current feed from a central "utility" source.

DETAILED DESCRIPTION OF THE INVENTION

Figure 1:
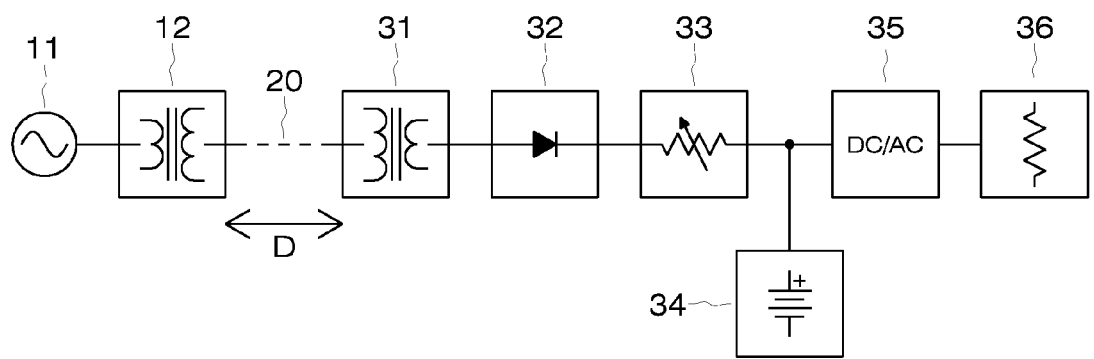
FIG. 1 is a power system block diagram illustrating the most generic embodiment of the invention.

FIG. 1 shows the most basic form of the invention. AC source 11 and step-up transformer 12 are physically separated from step-down transformer 31, rectifier 32, charge controller 33, battery 34, inverter 35 and household loads 36 by transmission distance D over transmission cable 20. Transmission cable 20 is a light gauge, two-conductor, direct burial cable and distance D may be miles. AC source 11 is typically sourced from an electric utility grid. Step-up transformer 12 steps up AC source 11 voltage so that power can be efficiently transmitted over distance D on transmission cable 20. Step-down transformer 31 reduces the transmission voltage to provide cost effective rectifier 32 and charge controller 33 operational voltages. The transmission voltage may be as high as 1000Vac, the top of the "low voltage" transmission voltage class. Rectifier 32 converts AC to DC and charge controller 33 regulates the current into battery 34. Battery 34 may source energy from AC source 11 at a constant rate and for 24 hours a day. Inverter 35 supplies AC power to household loads 36, loads which typically have high peak to average ratios over any given time period. Battery 34 acts as an energy buffer to support high crest factor loads. As such, transmission cable 20 conductors can be much smaller than a non-buffered system because (i) they need only accommodate the average load over a relatively long period and (ii) voltage drop on transmission cable 20 may be up to 50% without affecting the voltage regulation or power quality at loads 36. If distance D is relatively short with respect to the size of the remote loads 36 being served, then step-up transformer 12 and step-down transformer 31 may be eliminated.

Figure 2:
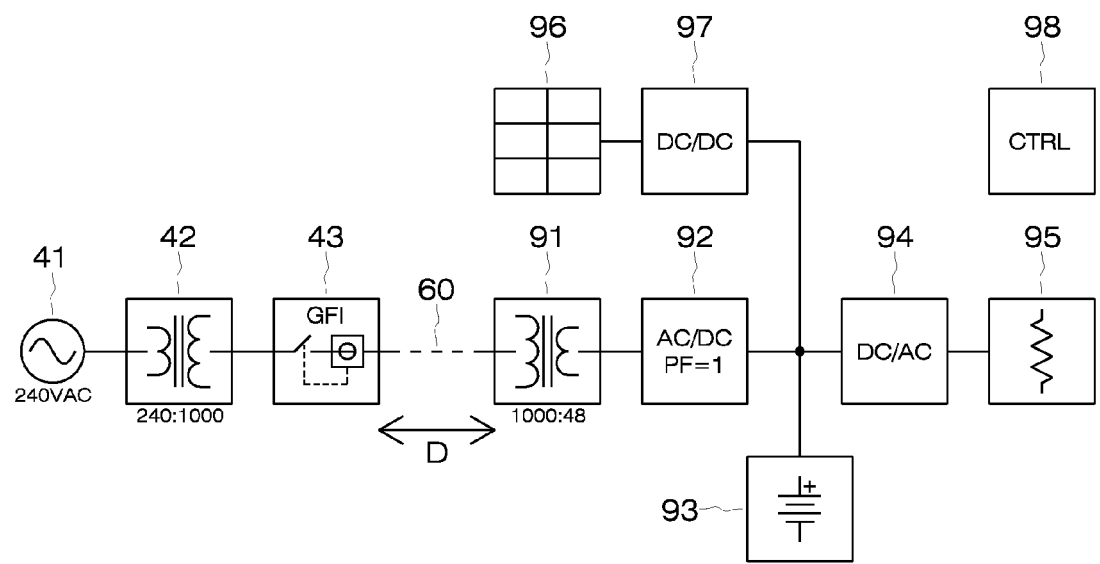
FIG. 2 is a power system block diagram illustrating the preferred embodiment of the invention.

FIG. 2 shows the preferred embodiment of the invention. AC source 41, step-up transformer 42 and ground fault interrupt device 43 are physically separated from all other elements shown in FIG. 2 by transmission distance D. Transmission cable 20 runs the length of transmission distance D and is a light gauge, two-conductor, direct burial cable. Distance D may be miles. AC source 41 is typically an electric utility service. Step-up transformer 42 steps up AC source 41 voltage so that power can be efficiently transmitted over distance D on transmission cable 60. Typical transmission voltages could be 600Vac to leverage the lower cost of 600Vdc class equipment, or 1000Vac for longer runs where higher equipment costs are justified. Ground fault interrupt device 43 allows transmission cable 60 to be a two conductor cable without a ground wire. Either step-up transformer 42 or step-down transformer 91 will have an earth-ground-referenced high side winding or ground fault interrupt device 43 will be an insulation resistance monitoring type. Step-down transformer 91 supplies charge controller 92 with a suitable range of voltages to perform unity power factor rectification. Charge controller 92 regulates current into battery 93 and has voltage boost or buck capabilities. Battery 93 is a bank of batteries sized for a specific remote load profile, transmission cable 60 losses and a maximum continuous battery charge current. Inverter 94 converts DC battery power to AC power to supply residential loads 95. The battery and inverter types may be the same types used in off-grid solar power systems. Since the invention is a battery-centric system, other generator sources and DC loads may easily be connected in parallel with battery 93. In FIG. 2 solar photovoltaic panels 96 are connected to charge controller 97 to augment or to reduce the power from utility source 41. In a system where multiple charge controllers are used, a central system controller 98 may be used to orchestrate the battery charging. All the equipment shown and described in FIG. 2 is commercially available with the exception of charge controller 92 and possibly a cost effective 1000Vac ground fault interrupt device. FIG. 2 shows arbitrary voltages for AC source 41 and transformers 42 and 91.

In a slight variant with respect to the block diagram show in FIG. 2, ground fault interrupt device 43 may sense a ground fault on the higher voltage winding of step-up transformer 42 but interrupt the power flow to transmission cable 60 between AC source 41 and the lower voltage winding of step-up transformer 42.

What I claim as my invention is:

1. An electrical power system for powering remote loads comprising; an AC power source coupled to a step-up transformer coupled to a power transmission cable coupled to a step-down transformer coupled to a rectifier coupled to a DC charge controller coupled to a battery coupled to a DC-to-AC power converter wherein;
    AC power is transferred from the AC power source to a lower voltage winding of the step-up transformer and wherein;
    AC power is transferred from a higher voltage winding of the step-up transformer to the power transmission cable and wherein;
    AC power is transferred from the power transmission cable to a higher voltage winding of the step-down transformer and wherein;
    AC power is transferred from a lower voltage winding of the step-down transformer to the rectifier and wherein;
    DC power is transferred from the rectifier to the DC charge controller and wherein;
    DC power is transferred from the DC charge controller to the battery and wherein;
    DC power is transferred from the battery to the DC-to-AC power converter wherein;
    AC power is transferred from DC-to-AC power converter to an AC load.

2. An electrical power system for powering remote loads according to claim 1 and further comprising; a ground fault interrupt device and an integrated AC-to-DC charge controller wherein;
    the ground fault interrupt device is coupled between said step-up transformer and said power transmission cable and wherein;
    AC power is transferred from the step-up transformer higher voltage winding to the ground fault interrupt device and wherein;
    AC power from the ground fault device is transferred to the power transmission cable and wherein;
    the integrated AC-to-DC charge controller is substituted for the series combination of both said rectifier and said DC charge controller.

3. The electrical power system for powering remote loads according to claim 2 wherein said integrated AC-to-DC charge controller is a power factor corrected type.

4. An electrical power system for powering remote loads according to claim 1 further comprising; a solar photovoltaic source coupled to a second charge controller coupled to said battery wherein;
    DC power is transferred from the solar photovoltaic array to the second charge controller and wherein;
    DC power from the second charge controller is transferred to the battery.

5. An electrical power system for powering remote loads according to claim 2 wherein said ground fault interrupt device interrupts system power between the AC power source and the step-up transformer.

6. An electrical power system for powering remote loads according to claim 4 further comprising a system controller.

7. An electrical power system for powering remote loads according to claim 1 wherein said power transmission cable is a direct burial type.

8. The electrical power system for powering remote loads according to claim 1 packaged as a plug-and-play or pre-engineered product.

9. The electrical power system for powering remote loads according to claim 2 packaged as a plug-and-play or pre-engineered product.

10. The electrical power system for powering remote loads according to claim 3 packaged as a plug-and-play or pre-engineered product.

11. The electrical power system for powering remote loads according to claim 4 packaged as a plug-and-play or pre-engineered product.

12. The electrical power system for powering remote loads according to claim 5 packaged as a plug-and-play or pre-engineered product.

* * * * *